United States Patent
Van Lunteren

(10) Patent No.: US 9,886,278 B2
(45) Date of Patent: Feb. 6, 2018

(54) COMPUTING ARCHITECTURE AND METHOD FOR PROCESSING DATA

(71) Applicant: International Business Machines Corporation, Armonk, NY (US)

(72) Inventor: Jan Van Lunteren, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 320 days.

(21) Appl. No.: 14/496,132

(22) Filed: Sep. 25, 2014

(65) Prior Publication Data

US 2015/0121037 A1   Apr. 30, 2015

(30) Foreign Application Priority Data

Oct. 31, 2013 (GB) .................................. 1319217.4

(51) Int. Cl.
*G06F 9/30* (2006.01)
*G06F 9/38* (2006.01)

(52) U.S. Cl.
CPC .......... *G06F 9/3824* (2013.01); *G06F 9/3851* (2013.01); *G06F 9/3889* (2013.01)

(58) Field of Classification Search
CPC .................................................... G06F 9/3824
See application file for complete search history.

(56) References Cited

U.S. PATENT DOCUMENTS

| 6,295,599 | B1 | 9/2001 | Hansen et al. |
| 7,383,424 | B1 | 6/2008 | Olgiati et al. |
| 7,533,220 | B2 | 5/2009 | Diefendorff |
| 8,166,467 | B2 | 4/2012 | Biswas et al. |

FOREIGN PATENT DOCUMENTS

| EP | 0374598 A2 | 6/1990 |
| EP | 0463977 A2 | 1/1992 |
| EP | 1050805 A1 | 8/2000 |
| GB | 2200483 A | 8/1988 |
| JP | 2007524905 A | 8/2007 |
| JP | 2012088961 A | 5/2012 |

OTHER PUBLICATIONS

Shen et al.; Modern Processor Design: Fundamentals of Superscalar Processors; Oct. 2002; McGraw-Hill Companies, Inc.*

(Continued)

*Primary Examiner* — Corey S Faherty
(74) *Attorney, Agent, or Firm* — Cantor Colburn LLP

(57) ABSTRACT

A processing device includes an execute processor configured to execute data processing instructions; and an access processor configured to be coupled with a memory system to execute memory access instructions; wherein the execute processor and the access processor are logically separated units, the execute processor having an execute processor input register file with input registers, and a data processing instruction is executed as soon as all operands for the respective data processing instruction are available in the input registers.

20 Claims, 2 Drawing Sheets

(56) References Cited

OTHER PUBLICATIONS

A. Milidonis, et al., "Decoupled Processors Architecture for Accelerating Data Intensive Applications using Scratch-Pad Memory Hierarchy," J. Sign. Process. System, 59, 2010, pp. 281-296.
C. Liu, et al., "Bridging the Processor-Memory Performance Gap with 3D IC Technology," 3D Integration, IEEE Design and Test of Computers, 2005, pp. 556-564.
D. Molka, et al., "Memory Performance and Cache Coherency Effects on an Intel Nehalem Multiprocessor System," IEEE, 18th International conference on Parallel Architectures and Compilation Techniques, 2009, pp. 261-270.
IPO UK Search Report, Application No. GB1319217.4, Patents Act 1977: Search Report Under Section 17(5), dated Apr. 4, 2014, pp. 1-3.
J. Richardson, et al., "Comparative Analysis of HPC and Accelerator Devices: Computation, Memory, I/O, and Power," IEEE, 2010, pp. 1-10.
James E. Smith, "Decoupled Access/Execute Computer Architectures," ACM Transactions on Computer Systems, vol. 2, No. 4, Nov. 1984, pp. 289-308.
P. Jacob, et al., "Mitigating Memory Wall Effects in High-Clock-Rate and Multicore CMOS 3-D Processor Memory Stacks," Invited Paper, Proceedings of the IEEE, vol. 97, No. 1, Jan. 2009, pp. 108-122.
R. Buchty, et al., "A Survey on Hardware-Aware and heterogeneous computing on multicore processors and accelerators," Special Issue Paper, Concurrency and computation: Practice and Experience, 2012, 24, pp. 663-675.
T. Zhang, et al., "DSP Systems Using Three-Dimensional Integration Technology," Handbook of Signal Processing Systems, Jul. 2010, pp. 835-864.

\* cited by examiner

COMPUTING ARCHITECTURE AND METHOD FOR PROCESSING DATA

FOREIGN PRIORITY

This application claims priority to Great Britain Patent Application No. 1319217.4, filed Oct. 31, 2013, and all the benefits accruing therefrom under 35 U.S.C. § 119, the contents of which in its entirety are herein incorporated by reference.

BACKGROUND

The present invention relates to computing architectures, in particular to computing architectures having logically separated access and execute processors. The present invention further relates to methods for providing data from the access processor to the execute processor.

For some time, there has been a growing gap between processor performance and memory performance, since the processing frequency is increasing faster than the access frequency for retrieving memory data due to memory latency. In other words, the retrieval speed of data from the memory is decreasingly able to catch up with the processing speed of the processors.

Decoupled access/execute computer architectures have long been well-known and have been introduced e.g., by J. E. Smith, "Decoupled Access/Execute Computer Architectures", ACM Transactions on Computer Systems, Vol. 2, No. 4, November 1984, pages 289-308, wherein the concept of a decoupled access/execute computer architecture as a means to tolerate larger memory latencies for general purpose computing has been introduced.

The above document describes the execute processor with an out-of-order execution that separates the fetch and decode stages from the general execute stage in a pipelined processor by using a buffer. The purpose of the buffer is to partition the memory access functions and execute functions provided by a computer program and to achieve high performance by exploiting a fine-grained parallelism between the two. Thereby, the memory latency can be effectively hidden from the processor execution.

However, the proposed architecture could so far not be established for general purpose computing. One drawback becomes obvious in case of a branch misprediction in the processor, i.e., if the entire buffer will need to be deleted/flushed wasting clock cycles, thereby reducing the efficiency of the decoupled access/execute computer architecture. Consequently, control-intensive code, in particular data-dependent branches in the code thread, cannot be handled in a satisfactory manner. Memory latency problems in general purpose computers have instead been addressed by alternative concepts, such as hardware-based, out-of-order execution and prefetching.

Hence, the above document is focused on special-purpose processing, in particular on DSP accelerators, which are generally facing the same fast-growing gap between processor and memory performance. For specific DSP workloads, memory bandwidth has become the bottleneck factor that limits the performance since these processes do not include frequent code branching.

In document A. Milidonis et al., "Decoupled Processor Architecture for Accelerating Data-Intensive Applications Using Scratch-Pad Memory Hierarchy", Journal of Signal Processing Systems, June 2010, Vol. 59, Issue 3, pp. 281-296, a decoupled architecture is described having a memory hierarchy built with scratch-pad memories between which data is transferred using DMA operations that are under the control of an access processor. An access processor of the decoupled architecture is further configured to control the exchange of data between an L1 scratch-pad memory and a register file of the execute processor. Data transfers to and from the register file of the execute processor are initiated by the execute processor which for that purpose submits a read or write request to the access processor by writing a bit flag into a buffer.

SUMMARY

In one embodiment, a processing device includes an execute processor configured to execute data processing instructions; and an access processor configured to be coupled with a memory system to execute memory access instructions; wherein the execute processor and the access processor are logically separated units, the execute processor having an execute processor input register file with input registers, and a data processing instruction is executed as soon as all operands for the respective data processing instruction are available in the input registers.

In another embodiment, a computing system includes a memory system; an execute processor configured to execute data processing instructions; and an access processor coupled with the memory system to execute memory access instructions; wherein the execute processor and the access processor are logically separated units, the execute processor having an execute processor input register file with input registers, and a data processing instruction is executed as soon as all operands for the respective data processing instruction are available in the input registers.

In another embodiment, a method for operating a processing device, the processing device including an execute processor configured to execute data processing instructions, and an access processor configured to be coupled with a memory system to execute memory access instructions includes reading data out of the memory system; providing the data to the execute processor as operands; and determining whether all operands are available in the execute processor for one of one or more waiting data processing instructions; wherein the data processing instruction which is triggered by the availability of all operands associated with one of the waiting data processing instructions is executed; wherein the execute processor and the access processor are logically separated units, the execute processor having an execute processor input register file with input registers, and a data processing instruction is executed as soon as all operands for the respective data processing instruction are available in the input registers.

BRIEF DESCRIPTION OF THE SEVERAL VIEWS OF THE DRAWINGS

Embodiments are described in more detail in conjunction with the accompanying drawings in which.

DETAILED DESCRIPTION

Figure 1:
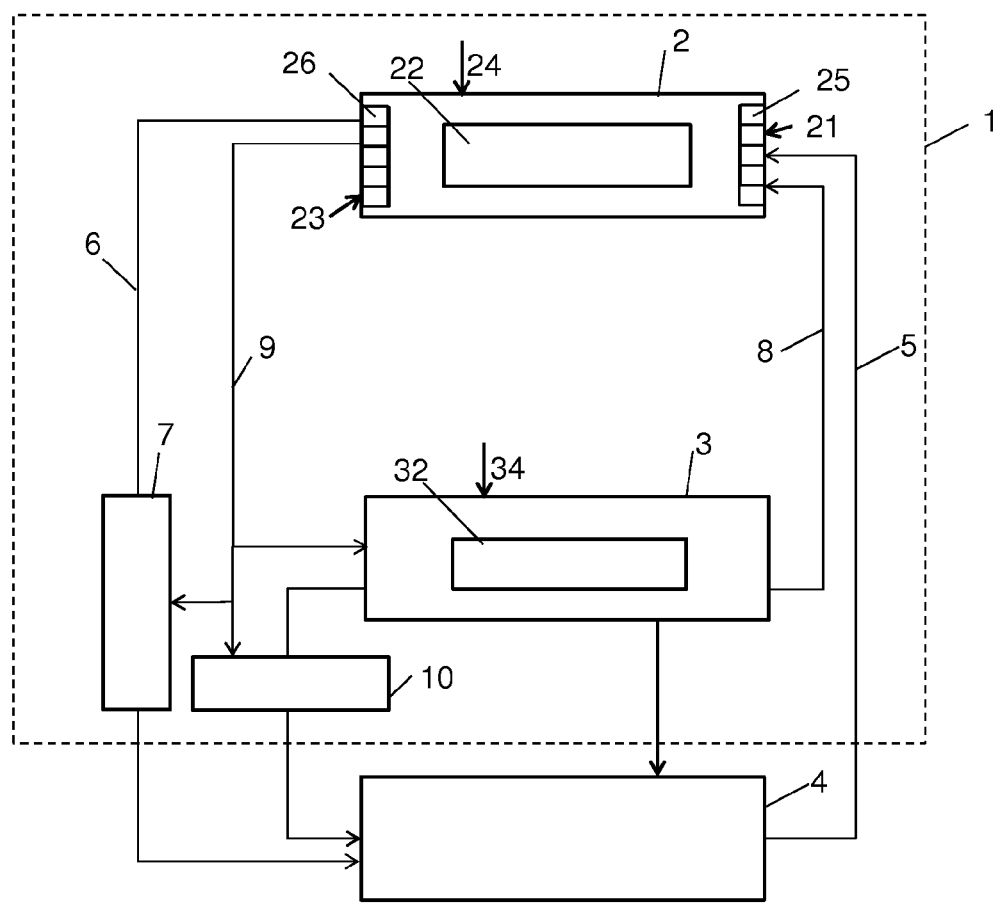
FIG. 1 is a block diagram of a computing system having a decoupled architecture, in accordance with an exemplary embodiment.

According to an embodiment, a processing device is provided, including an execute processor for performing data processing instructions; and an access processor to be coupled with a memory system and for performing memory access instructions, wherein the execute processor and the access processor are logically separated units, the execute processor has an execute processor input register file with input registers, and data processing instructions are executed in the execute processor as soon as all operands for the respective data processing instruction are available in the input registers.

Conventionally, a decoupled architecture provides a computing system having an access processor and an execute processor. The access and execute processors are logically separated hardware units which are provided with split threads of memory access instructions and data processing instructions, respectively. The synchronization of data flow between the access processor and the execute processor is usually performed through a set of architectural queues. The access processor performs the calculation of addresses for read and write operations to and from the memory system, wherein data retrieved from the memory stored in a buffer can be consumed by the execute processor as required. Mostly, this data is retrieved from the memory before it is actually processed by the execute processor, so that larger access latencies regarding the data retrieval from the memory can be tolerated. Further queues may be provided which provide additional mechanisms for synchronization between access processor and execute processor in order to exchange information on certain branches of the code thread that have to be processed. In case the access processor has to wait for data from the execute processor for calculating an address, the memory access stream will be blocked temporarily. This effect is known as loss of decoupling, which will negatively affect the overall performance of the computing system having such a decoupled architecture.

One idea of the above processing device is to omit the data buffer in the read data path from the access processor to the execute processor and to directly transfer the required data from the memory system to an execute processor input register file. Processing in the execute processor core is then carried out upon the availability/provision of operands/data stored in the execute processor input register file which are needed as input for the waiting data processing instruction. In other words, data processing instructions are waiting in the execute processor wherein the processing of a respective data processing instruction is initiated/triggered by the availability of all operands required to perform the respective instruction.

Such a decoupled architecture may allow for better efficiency, particularly if the instruction code thread has frequently nested branches, which lowers the efficiency of a conventional processing device of decoupled architecture using a read buffer in the read data path between the access processor and the execute processor. According to embodiments of the invention, the overall memory system may be substantially simplified and the power consumption may also be significantly reduced.

Moreover, according to embodiments, data processing instructions may be triggered by the availability of the operands associated with the respective data processing instruction, i.e., by the arrival of the last required operand in the execute processor input register file.

According to an embodiment, the operands may be transferred as read data from the memory system by means of a read data line, wherein the read data line directly couples the memory system with the execute processor input register file.

Furthermore, the input register in which read data are to be written may be addressed by means of read tag data provided by the access processor, wherein the read tag data indicates an address of the input register file to which the read data is to be written.

It may be provided that the availability of operands in the input registers is indicated by a respective data valid flag associated to each of the input registers in the execute processor, so that a respective one of the waiting data processing instructions is executed as soon as all data valid flags associated to the input registers keeping the operands needed, are set. In particular, the access processor may provide read data to those input registers of the execute processor whose data valid flags are not set and/or to those input registers which shall keep/obtain operands for data processing instructions waiting in the execute processor.

According to the data processing instruction which has been executed, the data valid flag of the associated operands may be either reset or kept. In particular, the resulting data may be written either back to one of an execute processor input register for processing a further instruction waiting in the execute processor and an execute processor output register for writing the output data to a memory system. Moreover, the result/output data, which are an outcome of the data processing instructions executed in the execute processor, may be written to the memory system via a write buffer, wherein particularly the process of writing data from the write buffer to the memory system is prioritized over any further memory accesses.

According to an embodiment, the execute processor may include at least one of a microcontroller, an ALU, a butterfly unit for an FFT calculation and the like.

The access processor may be directly coupled to the execute processor input register file to transmit internal instructions directly to the execute processor. One or more execute processors may be provided to handle a plurality of execution threads each associated with a separate portion of the memory system.

According to an embodiment of a further aspect, a computing system is provided comprising the above processing device and a memory system. Furthermore, the access processor and the memory system may be logically integrated.

According to an embodiment of a further aspect, a method for operating the above processing device is provided, wherein data to be processed in the execute processor is read out of a memory system and provided to the execute processor as operands, wherein it is determined whether all operands are available in the execute processor for one of the one or more waiting data processing instructions, and wherein the respective data processing instruction which is triggered by the availability of all operands associated with the respective waiting data processing instructions is executed.

FIG. 1 schematically shows a block diagram of a computing system with a processing device 1 of a decoupled architecture. The processing device 1 comprises an execute processor 2 and an access processor 3, which are logically separated hardware units integrated in one single or multiple hardware blocks, such as integrated circuits.

The access processor 3 is provided with an access processor core 32 for performing memory access instructions and the execute processor 2 is provided with an execute processor core 22 for performing data processing instructions. In general, the access processor 3 and the execute processor 2 might be integrated as small cores with dedicated instruction sets and their own or shared instruction memory (not shown).

The access processor 3 is configured to perform the calculation of addresses for read and write operations from and to a memory system 4 coupled with the processing device 1 or included therein. According to another embodiment, the access processor 3 may be integrated in the memory system 4. The organization of the memory system 4, e.g., number of memory banks, bandwidth, access and cycle times, refresh cycles and the like, is freely exposed to the access processor 3. The access processor 3 may include a programmable address mapping scheme to control access of the memory system 4.

Moreover, conventional memory controller functions may be integrated into the access processor 2 in a programmable way; in particular, the ability to program the access processor 2 to control the page open and close and refresh operations of DRAMs in the memory system 4 allows to even better adapt the memory operations to the application characteristics.

In operation, the access processor core 32 and the execute processor core 22 are supplied with a memory access instruction thread (memory access code thread) via an access instruction bus 34 and a data processing instruction thread (data processing code thread) via a processing instruction bus 24, respectively. The memory access instruction thread and the data processing instruction thread are obtained as a result of a suitable compilation of an original program code to perform the program code in the processing device 1.

Furthermore, the execute processor 2 is provided with an execute processor input register file 21 having a number of input registers 25 and with an execute processor output register file 23 having a number of output registers 26. To bring/transfer data to the execute processor 2, a read data bus 5 is provided which connects the memory system 4 and optionally the access processor 3 with the execute processor 2, so that read data can be directly transferred from the memory system 4 to an execute processor input register file 21 of the execute processor 2 under control of the access processor 3. In particular, no buffer is provided within the read data bus 5.

The access processor 3 is further configured to schedule instructed read accesses from the memory 4 and via the read data bus 5 such that the data is directly transferred from the memory system 4 to input registers 25 of the execute processor input register file 21 in the execute processor 2 when data is to be retrieved from the memory system 4. Furthermore, the execute processor output register file 23 is connected via a write data bus 6 to a write buffer 7 for writing resulting/processed data available in the execute processor output register file 23 to the memory system 4.

Each of the input registers 25 of the execute processor input register file 21 can be addressed via read tag data provided via a read tag address line 8 connecting the access processor 3 with the execute processor 2. The read tag data is generated by the access processor core 32 which provides an input register address for the targeted input register 25 in the execute processor input register file 21. Thereby, read accesses are performed by providing the read data and the input register address to channel the read data to the addressed input register 25 in the execute processor input register file 21. Hence, read accesses are substantially initiated and controlled by the access processor 3. In this way, it is under the control of the access processor core 32 to start a read operation for the execute processor 2 and a corresponding data transfer at any time.

The execute processor output registers 26 are used to directly write any output data (result data), which are obtained by processing in the execute processor core 22, to the memory system 4. When data resulting from processing in the execute processor 2 is to be written to the memory system 4, the write data is directly written to the write buffer 7 via the output registers 26 of the execute processor output register file 23 and via the write data bus 6.

The memory address location to which the write data is to be written is selected by write tag data that is generated or determined by the execute processor core 22 and communicated via a write tag address line 9 connecting the execute processor 2 with the write buffer 7 and the access processor 3. The write tag address line 9 is substantially used for communicating the write address as write tag data for the respective output data to be written back to the memory system 4. Usually, the write tag data might be equal to or derived from the read tag data associated with the input data that was retrieved from the memory system 4 and contains the operand values for an instruction.

For addressing the memory system 4 to write output data, a write address table 10 can be used. The access processor 3 is configured to pre-calculate write addresses for directing the output data to be written from the write buffer 7 to a desired memory location in the memory system 4. The write addresses are stored in the write address table 10. The write address table 10 also receives write tag data via the write tag data line 9 and selects the write address to be used for writing the output data in response of the write tag data, i.e., the write addresses are associated with the write tag data in the write address table 10. The write buffer 7 is then configured to buffer the output data to be written. The output data is only buffered for more than one clock cycle when the memory system 4, e.g., the memory banks involved in the write operation, are busy with any other ongoing access.

It can be provided that the write accesses from the write buffer 7 to the memory system 4 may have priority over any read accesses required by the access processor 3. In general, the execute processor 2 initiates the process of providing output data that is to be written from the output register file 23 of the execute processor 2 over the write data bus 6 to the memory system 4. In a typical implementation as described above, the access processor 3 can be the master and the execute processor 2 can be the slave, with the access processor 3 performing the scheduling of memory accesses, the busses and the execution in the execute processor 2.

In contrast to the microcontroller-based approach as described above, the execute processor 2 might further be a general processing unit that can also be a simple arithmetic logical unit (ALU) or a set of dedicated hardware function units that can only perform a single type of operation, for example a butterfly unit for an FFT calculation or a unit for an FIR filter. In this case the execute processor core 22 is reduced to a simple data path.

Processing by the execute processor 2 is triggered by the availability of the operands/data in the execute processor input register file 21 or by the arrival of the last operand/data among all operands needed to perform a respective data processing instruction waiting to be processed in the execute processor 2. In other words, as soon as the operands, i.e., the read data required for a specific instruction waiting to be processed in the execute processor 2, are fully available, the respective instruction is executed being triggered by the arrival/availability of the last missing operand for the specific data processing instruction.

The availability of each of the required operands might be indicated by a data valid flag associated with each input register 25 of the execute processor input register file 21. The data valid flag is set upon the arrival of any new read data via the read data bus 5 and the respective read data tag indicating the input register address of the input register 25 in the execute processor input register file 21. The data valid flag associated with each of the input registers 25 can be reset by the execute processor core 22 upon completion of the processing of the specific instruction triggered before.

It might also be possible, for example, for FFT calculations using twiddle factors as input operands, to re-use the same input data multiple times as long as the data valid flag is kept set during that time. The access processor 3 may include multiple hardware threads that are executed in parallel or in an interleaved fashion. Each thread can perform a specific type of address generation and the corresponding execution. For example, for an FFT application, one thread can be used to generate the addresses to access the samples, and a second thread can be used to generate the addresses for the twiddle factors.

Communication between the execute processor 2 and the access processor 3 enables both the memory accesses and the data processing of the access processor 3 and the execute processor 2 to be performed out of order, which can result in substantial performance improvements because it may resolve dependencies of locking, e.g., due to certain memory banks being occupied by other accesses.

Furthermore, the communication scheme can be used to prevent the access processor 3 from overloading the execute processor 2. By limiting the number of different read tag values that can be used or by applying the restriction that no new read tag can be generated for which there is still an entry in the write table, an efficient kind of back pressure can be applied to guarantee correct operation without requiring additional queues in the read data bus 5, share buffer memory or by any other form of communication between the execute processor 2 and access processor 3. The conventionally used read data buffers are replaced by a management of input register addresses supplied via the read tag address line 8 thereby assigning a free (not used) input register 25 with the next read data to be supplied to the execute processor 2. By means of a dedicated compiler, the waiting instruction watches respective input registers 25 for operands to perform its instruction as soon as all operands are available in the execute processor input register file 21.

To improve communication between the access processor 3 and execute processor 2, particularly for controlling each other's operation (mutual operational control), it may be provided that the access processor 3 can write data directly to the execute processor input register file 21. Similarly, the execute processor 2 can write directly to an input register file 31 of the access processor 3. For this purpose, specially reserved registers can be used or these operations can be explicitly scheduled by the access processor 3.

In particular, dedicated instruction sets for both the execute processor 2 and the access processor 3 might be applied. Both processors 2, 3 can be based on a programmable state machine (B-FSM controller), which allows efficient data validation testing for the execute processor 2 as well as efficient loop controls for the access processor 3. For instance, a programmable state machine in the execute processor 2 can be used to determine if all the operands for a given instruction are available. Moreover, a programmable state machine of the access processor 3 can be used to allow parallel testing of multiple counters and other conditions, in order to enable an efficient programmable instruction scheduling.

One further advantage of the above-described architecture is that it is scalable in terms of memory configuration. For example, memories with different cycle times, any numbers of memory banks, while the memory lines and the like requires only the access processor 3 to be adapted while the main processing in the execute processor 2 substantially remains unchanged. This allows for the combination of different memory systems to one system, wherein each memory system has its specific program and all memory systems are served by the same execute processor 2.

Figure 2:
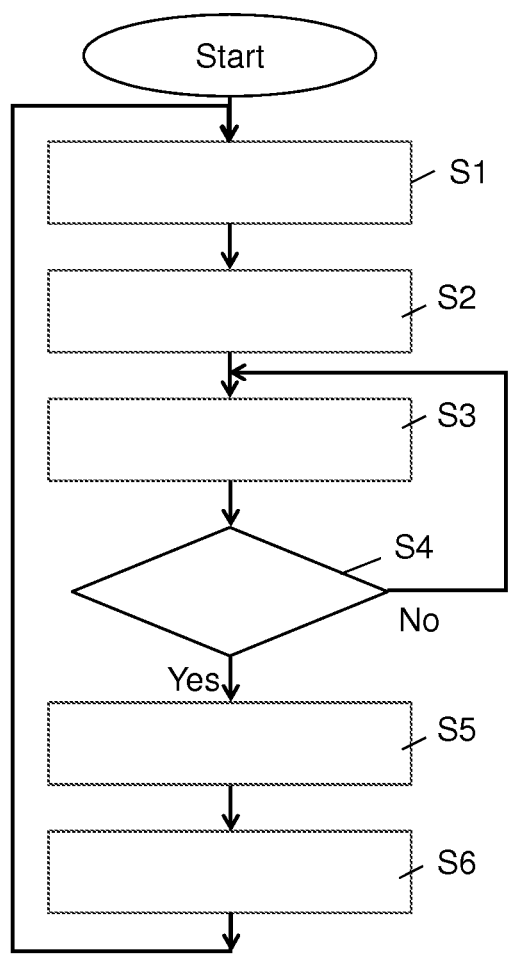
FIG. 2 is a flow diagram illustrating a method for operating the computing system of FIG. 1, in accordance with another embodiment.

In FIG. 2, a flow diagram for illustrating a typical data flow scheme in the computing system of FIG. 1 is shown. In operation S1, one or more data processing instructions are loaded into a data processing instruction memory in the execute processor 2. In the instruction memory, instructions are waiting to be processed while watching the associated input registers 25 for operands becoming valid. As described above, the loaded data processing instructions require the availability of operands in the associated input registers 25 of the execute processor input register file 21.

In operation S2, memory access instructions are loaded into an access instructions memory of the access processor 3. The access instructions are performed successively, as long as free input registers 25 are available or as long as the execute processor 2 has executional instructions that are waiting for operands to appear in specific input registers 25. As described above, an operand "appears" in a respective input register 25 when the respective data valid flag associated to the respective input register 25 has been set.

In operation S3, data to be processed is read out of the memory system 4 according to a mapping scheme implemented in the access processor 3. The scheduling and mapping scheme manages the data access, e.g., for optimizing the latency and access times, and provides the data retrieved from the memory system 4 directly to an addressed input register 25 of the execute processor input register file 21. The input register 25 is addressed using the read tag data associated with the read data to be transmitted to the execute processor 2.

If in operation S4 it is determined in the execute processor 2 that for one of the one or more waiting instructions all operands are available (Alternative: Yes) the process is continued with operation S5. Otherwise (Alternative: No), operation S3 is repeated.

In operation S5, the instruction for which all operands have been determined as available is executed and the valid flags are reset as required by the instruction. The output data obtained by performing the respective instruction is stored in a dedicated output register 26 of the execute processor output register file 23. In other words, as soon as the last operand required by one of the waiting instructions is available, i.e., the respective data valid flag is set, the instruction is executed and the respective output is written via an output register 26 to the write buffer 7. In some embodiments it might be required that the input data is valid for more than one instruction to be executed, so that the reset operation is not performed on the respective input register 25.

If write data arrives in the write buffer 7 in operation S6, it will be written directly to the memory system 4 with priority over any read access performed in operation S3. The memory location to which the output data stored/buffered in the write buffer 7 is to be written is indicated by the write addresses pre-calculated by the access processor 3 and selected by the write tag data supplied by the execute processor 2 as a memory address associated with the respective instruction that has been executed. The process continues with operation S1, wherein the instruction buffers within the access processor 3 and execute processor 2 are filled up as necessary and the process continues.

By using multiple threads running on a single execute processor 2 or, alternatively, having multiple execute processors 2, attached to the memory system 4 comprised of multiple memory banks and controlled by the access processor 3, it becomes possible to program pipelined modes of operation. In this case, some of the memory banks of the memory system 4 can be programmed to "serve" as the buffers ("latches") separating the pipeline stages, each of which is executed on different execute processors 2 (or in special cases, in an interleaved fashion on a single execute processor).

For example, a first pipeline stage implemented as code executed by a first execution thread (or a first execute processor), involves processing input data stored in one or more first memory banks of the memory system 4 and storing the resulting output data in one or more second memory banks of the memory system 4 (different from the first memory banks). This first pipeline may access the one or more first memory banks multiple times, for example, to store and retrieve intermediate processing results. A second pipeline stage implemented as code executed by a second execution thread (or second execute processor) involves processing the output data from the first pipeline stage that it retrieves from the one or more second memory banks, and storing the results of that processing e.g., in one or more third memory banks of the memory system 4.

The number of execution threads (or execute processors) and the number of memory banks can be varied based upon the actual processing and memory access requirements by the various pipeline stages, enabling a very flexible adaptation and tuning of the available resources to obtain an optimal performance.

REFERENCE LIST 1 processing system
2 execute processor
21 execute processor input register file
22 execute processor core
23 execute processor output register file
24 processing instruction bus
25 input register
26 output register
3 access processor
32 access processor core
34 access instruction bus
4 memory system
5 read data bus
6 write data bus
7 write buffer
8 read tag address line
9 write tag address line
10 write address table

The invention claimed is:

1. A processing device, comprising:
an execute processor configured to execute data processing instructions, the execute processor comprising an execute processor input register file with input registers; and
an access processor configured to be coupled with a memory system to execute memory access instructions;
wherein the memory access instructions are executed by the access processor in response to determining that an input register is available;
wherein the execute processor and the access processor are logically separated units and a data processing instruction is executed as soon as all operands for the data processing instruction are available in the input registers, each operand directly transferred from the memory system to a targeted input register of the execute processor input register file;
wherein an input register address for each targeted input register is directly transferred from the access processor to the execute processor; and
wherein the access processor controls scheduling of read operations from the memory system for the execute processor by controlling all operand transfers to the input registers.

2. The processing device of claim 1, wherein the processing of one data processing instruction is triggered by one of the availability of the operands associated with the one data processing instruction and by the arrival of the last operand required as input for the one data processing instruction.

3. The processing device of claim 1, wherein the operands are transferred as read data from the memory system by a read data line, and the read data line directly couples the memory system with the execute processor input register file.

4. The processing device of claim 1, wherein the input registers in which read data is to be written are addressed by read tag data provided by the access processor, and the read tag data indicates an address of the execute processor input register file to which the read data is to be written.

5. The processing device of claim 1, wherein the availability of operands in the input registers is indicated by a respective data valid flag associated with each of the input registers, so that the data processing instruction is executed upon the setting of all data valid flags associated with the input registers keeping the required operands.

6. The processing device of claim 5, wherein the access processor provides read data to those input registers of the execute processor whose data valid flags are not set and/or to those input registers which keep operands for data processing instructions waiting in the execute processor.

7. The processing device of claim 5, wherein according to the data processing instruction which has been executed, the data valid flags of the associated operands are either at least partly reset or at least partly kept.

8. The processing device of claim 1, wherein the result/output data, which are an outcome of the data processing instructions executed in the execute processor, are written via a write buffer to the memory system, wherein a process of writing data from the write buffer to the memory system is prioritized over any further memory accesses.

9. The processing device of claim 1, wherein the execute processor includes at least one of: a microcontroller, an ALU, and a butterfly unit for an FFT calculation.

10. The processing device of claim 1, wherein the access processor is directly coupled to the execute processor input register file to directly transmit internal instructions to the execute processor.

11. The processing device of claim 1, further comprising one or more additional execute processors to handle a plurality of execution threads each associated with a separate portion of the memory system.

12. A computing system, comprising:
a memory system;

an execute processor configured to execute data processing instructions, the execute processor comprising an execute processor input register file with input registers; and an access processor coupled with the memory system to execute memory access instructions;

wherein the memory access instructions are executed by the access processor in response to determining that an input register is available;

wherein the execute processor and the access processor are logically separated units and a data processing instruction is executed as soon as all operands for the data processing instruction are available in the input registers, each operand directly transferred from the memory system to a targeted input register of the execute processor input register file;

wherein an input register address for each targeted input register is directly transferred from the access processor to the execute processor; and wherein the access processor controls scheduling of read operations from the memory system for the execute processor by controlling all operand transfers to the input registers.

13. The computing system of claim 12, wherein the access processor and the memory system are logically integrated.

14. The computing system of claim 13, wherein the processing of one data processing instruction is triggered by one of the availability of the operands associated with the one data processing instruction and by the arrival of the last operand required as input for the one data processing instruction.

15. The computing system of claim 13, wherein the operands are transferred as read data from the memory system by a read data line, and the read data line directly couples the memory system with the execute processor input register file.

16. The computing system of claim 13, wherein the input registers in which read data is to be written are addressed by read tag data provided by the access processor, and the read tag data indicates an address of the execute processor input register file to which the read data is to be written.

17. The computing system of claim 13, wherein the availability of operands in the input registers is indicated by a respective data valid flag associated with each of the input registers, so that the data processing instruction is executed upon the setting of all data valid flags associated with the input registers keeping the required operands.

18. The computing system of claim 17, wherein the access processor provides read data to those input registers of the execute processor whose data valid flags are not set and/or to those input registers which keep operands for data processing instructions waiting in the execute processor.

19. The computing system of claim 17, wherein according to the data processing instruction which has been executed, the data valid flags of the associated operands are either at least partly reset or at least partly kept.

20. A method for operating a processing device, the processing device including an execute processor configured to execute data processing instructions, and an access processor configured to be coupled with a memory system to execute memory access instructions, the method comprising:

reading data out of the memory system;

providing the data to the execute processor as operands; and determining whether all operands are available in the execute processor for one of one or more waiting data processing instructions;

wherein the memory access instructions are executed by the access processor in response to determining that an input register is available;

wherein the data processing instruction which is triggered by the availability of all operands associated with one of the waiting data processing instructions is executed;

wherein the execute processor and the access processor are logically separated units, the execute processor comprising an execute processor input register file with input registers, and a data processing instruction is executed as soon as all operands for the data processing instruction are available in the input registers, each operand directly transferred from the memory system to a targeted input register of the execute processor input register file;

wherein an input register address for each targeted input register is directly transferred from the access processor to the execute processor; and wherein the access processor controls scheduling of read operations from the memory system for the execute processor by controlling all operand transfers to the input registers.

* * * * *